(12) United States Patent
Wiszniewski et al.

(10) Patent No.: US 10,461,680 B2
(45) Date of Patent: Oct. 29, 2019

(54) METHOD FOR OPERATING A UNIVERSAL MOTOR

(71) Applicant: Robert Bosch GmbH, Stuttgart (DE)

(72) Inventors: Jacek Wiszniewski, Leinfelden-Echterdingen (DE); Klaus Dengler, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 54 days.

(21) Appl. No.: 15/029,438

(22) PCT Filed: Oct. 7, 2014

(86) PCT No.: PCT/EP2014/071431
§ 371 (c)(1),
(2) Date: Apr. 14, 2016

(87) PCT Pub. No.: WO2015/055464
PCT Pub. Date: Apr. 23, 2015

(65) Prior Publication Data
US 2016/0254773 A1    Sep. 1, 2016

(30) Foreign Application Priority Data

Oct. 17, 2013    (DE) ........................ 10 2013 221 088

(51) Int. Cl.
| | | |
|---|---|---|
| *G01R 31/327* | (2006.01) | |
| *H02P 25/14* | (2006.01) | |
| *H02P 1/18* | (2006.01) | |
| *H02P 1/16* | (2006.01) | |
| *H02P 3/06* | (2006.01) | |

(52) U.S. Cl.
CPC ............... *H02P 25/14* (2013.01); *H02P 1/16* (2013.01); *H02P 1/18* (2013.01); *H02P 3/06* (2013.01)

(58) Field of Classification Search
CPC .... H02P 1/16; H02P 1/18; H02P 25/14; H02P 3/06
USPC .................. 318/375, 11, 55, 635, 88, 104
See application file for complete search history.

(56) References Cited

U.S. PATENT DOCUMENTS

| | | | | |
|---|---|---|---|---|
| 5,530,325 | A | * | 6/1996 | Friedrich .............. H02P 25/145 318/245 |
| 2011/0316456 | A1 | * | 12/2011 | Rottmerhusen .......... H02P 3/22 318/381 |
| 2015/0108927 | A1 | * | 4/2015 | Wiszniewski .......... H02P 25/14 318/245 |

FOREIGN PATENT DOCUMENTS

| | | | |
|---|---|---|---|
| CN | 102342015 A | 2/2012 | |
| CN | 102598500 A | 7/2012 | |
| DE | 0352419 A2 * | 1/1990 | .............. B04B 9/10 |
| DE | 197 52 098 A1 | 5/1999 | |
| DE | 19752098 A1 * | 5/1999 | ........... D06F 37/304 |

(Continued)

OTHER PUBLICATIONS

International Search Report corresponding to PCT Application No. PCT/EP2014/071431, dated Mar. 12, 2015 (German and English language document) (5 pages).

*Primary Examiner* — Muhammad S Islam
(74) *Attorney, Agent, or Firm* — Maginot, Moore & Beck LLP

(57) ABSTRACT

A method for operating a universal motor, comprising the following steps: —establishing a synthetic variable from at least two physical operating parameters of the universal motor; and —operating the universal motor using operating parameters of this type so that the synthetic variable remains at a substantially constant level or at least does not exceed a defined permissible upper limit.

6 Claims, 5 Drawing Sheets

(56) References Cited

FOREIGN PATENT DOCUMENTS

| | | | |
|---|---|---|---|
| DE | 600 08 611 T2 | 2/2005 | |
| DE | 10 2010 004 311 A1 | 7/2011 | |
| EP | 0 352 419 A2 | 1/1990 | |
| FR | 60008611 T2 * | 2/2005 | .......... F02N 11/0859 |
| GB | 1 410 477 | 10/1975 | |

* cited by examiner

METHOD FOR OPERATING A UNIVERSAL MOTOR

This application is a 35 U.S.C. § 371 National Stage Application of PCT/EP2014/071431, filed on Oct. 7, 2014, which claims the benefit of priority to Serial No. DE 10 2013 221 088.4, filed on Oct. 17, 2013 in Germany, the disclosures of which are incorporated herein by reference in their entirety.

The present disclosure relates to a method for operating a universal motor. The present disclosure furthermore relates to a universal motor including a commutation device.

BACKGROUND

For controlling or regulating, known approaches for operating universal motors with electronic control use either measured rotational speed values and other physically measurable variables, for example, electric current or voltage, for influencing the characteristics of the universal motors. However, in this case, stored control methods generally do not take into account an influence of the aforementioned physical variables on the commutation system of the universal motor, which may manifest itself, for example, in the form of reduced brush service life, reduced carbon service life, etc.

DE 10 2010 004 311 A1 describes an electrodynamic braking device for a universal motor, in which a field winding is powered from a network during a braking operation and an armature is immediately short-circuited. In this case, a braking operation is carried out via a program of a controller of control electronics, whereby good braking is achieved with relatively low brush wear.

SUMMARY

One object of the present disclosure is to provide an improved method for operating a universal motor.

This object is achieved via a method for operating a universal motor including the steps of:
- ascertaining a synthetic variable made up of at least two physical operating parameters of the universal motor; and
- operating the universal motor using such operating parameters that the synthetic variable essentially remains at a constant level or at least does not exceed a defined, permissible upper limit.

This object is furthermore achieved via a universal motor including a commutation device, which is characterized in that a synthetic variable made up of at least two physical operating parameters of the universal motor is ascertainable, wherein the universal motor is operable using such operating parameters that the synthetic variable remains essentially at a constant level, or at least does not exceed a defined, permissible upper limit, during the operation of the universal motor.

Preferred specific embodiments of the method according to the present disclosure and of the universal motor according to the present disclosure are also the subject matter of the disclosure.

One preferred specific embodiment of the method according to the present disclosure provides that the synthetic variable is formed by means of a mathematical relationship made up of at least two of the following physical operating parameters of the universal motor: rotational speed, amperage, armature voltage, armature field voltage. In this way, different operating parameters of the electric motor may be used for forming the synthetic variable, whereby different, specific effects of the individual operating parameters on the universal motor may be taken into account.

Another advantageous refinement of the method according to the present disclosure provides that peak values or effective values of the physical operating parameters of the universal motor are used for forming the synthetic variable. As a result, a specific mode of action of the method according to the present disclosure may be designed according to the effects to be achieved. For example, during the start-up and braking operation of the universal motor, a use of effective values is advantageous; in other cases, where fewer mechanical influences occur, peak values are preferably used.

Another advantageous refinement of the method according to the present disclosure provides that an optimized parameter set for the universal motor is stored in a control device of the universal motor, as a function of the synthetic variable. As a result, a simple technical option for implementing the method according to the present disclosure is advantageously provided, in which a parameter set ascertained in advance is stored in control characteristics of the control device.

Another advantageous refinement of the method according to the present disclosure provides that the operating parameters used for forming the synthetic variable are essentially detected in real time, wherein the synthetic variable is essentially formed in real time, wherein an influencing variable for the universal motor is essentially changed in real time as a function of the synthetic variable. In this way, another option for the technical implementation of the method according to the present disclosure is provided. For example, a firing angle of a triac used as a controlled variable may be controlled or set in real time in the aforementioned manner. Alternatively, a firing angle may also be influenced in pulse width-modulated methods by means of IGBTs or other switching electronic components.

Another advantageous refinement of the method according to the present disclosure provides that a self-learning process is carried out for the synthetic variable. In this way, a kind of self-learning system is provided, which adapts in an increasingly improved way to specific usage characteristics of users over time.

Another advantageous refinement of the method according to the present disclosure provides that the method is carried out essentially during a start-up and/or during a braking operation of the universal motor. In this way, two critical operating phases of a universal motor are taken into account, in which a commutation device of the universal motor is particularly stressed and may benefit from the method according to the present disclosure.

As a result, gentle operation of the commutation device may be achieved in this manner.

Another advantageous refinement of the method provides that the synthetic variable is held at a low level. Advantageously, this results in particularly low brush sparking, thus resulting in particularly gentle operation of the commutation device.

In the present disclosure, it is considered to be particularly advantageous that brush sparking is minimized, resulting in a positive effect on the commutator and the carbon brushes of the universal motor. As a result, carbon life may be extended, and the commutation device may be designed more efficiently and economically.

The present disclosure is described in greater detail below having additional features and advantages, based on multiple figures. In this context, all described or illustrated features, individually or in any arbitrary combination, constitute the subject matter of the present disclosure regardless of their wording and representation in the description and in the figures. The figures are primarily intended to illustrate the principles relevant to the present disclosure.

DETAILED DESCRIPTION

According to the present disclosure, it is provided that a synthetic variable SG for a universal motor is generated or formed from real physical operating variables of the universal motor, for example, via a multiplication of the electric current by the rotational speed, a division of the electric current by the rotational speed, etc. The rotational speed essentially determines a mechanical abrasion of the commutation device, whereas a current essentially determines an electrical erosion of the commutation device. A mathematical relationship of the aforementioned two variables influences magnetic transverse fields or commutation voltages at lamination discontinuities of the commutation device.

The synthetic variable SG is preferably held at a constant, low level during the operation of the universal motor, or it is ensured that the synthetic variable SG does not exceed at least a defined, permissible upper limit, since it has been determined that in this way, a negative effect on a commutation device of the universal motor, for example, in the form of brush sparking, erosion, abrasion, etc., may be minimized or avoided to the greatest possible extent.

It has been determined that in a low rotational speed range of the universal motor, the electric current has a relatively small negative effect on the commutation device and may therefore flow at a higher amperage. In a higher rotational speed range in which the amperage has a greater negative effect on the commutation device, the amperage is accordingly minimized.

As a result, carbon service life of carbon in the commutation device may be extended, and the commutation device may be smaller and thus more economical due to the fact that it is operated in a gentle manner.

As a result, excellent haptic operating behavior of the universal motor is thereby also achieved, which is demonstrated by the fact that the universal motor reaches the intended rotational speed and develops its full power.

The mode of action of the method according to the present disclosure will now be explained using multiple figures.

Figure 1:
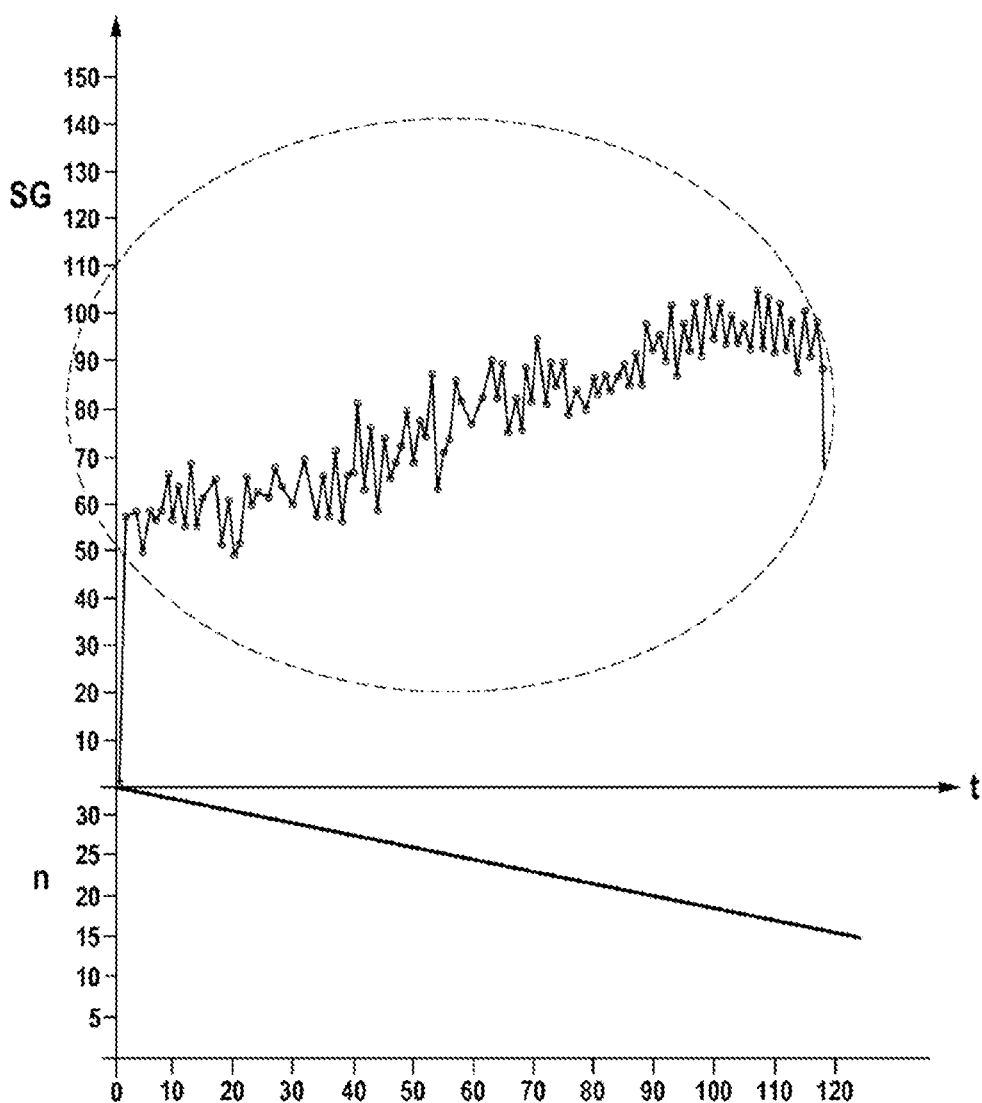
FIG. 1 shows a basic depiction of a conventional temporal profile of the synthetic variable during a braking operation of a universal motor.

FIG. 1 shows a conventional temporal braking profile of a universal motor, in which a rotational speed n (depicted on the y-axis in the lower section of FIG. 1) of the universal motor 100 drops essentially constantly. The synthetic variable SG is plotted without dimension on the y-axis in the upper section of FIG. 1. It is apparent that a profile of the synthetic variable SG in the framed region from t=0 to approximately t=1.2 s increases essentially constantly in an oscillating manner. As a result, heavy brush sparking of the brushes 14A and 14B may occur at the commutation device 10 of the universal motor, which disadvantageously heavily stresses the commutation device 10 and may greatly reduce the operating life of the commutation device 10.

Figure 2:
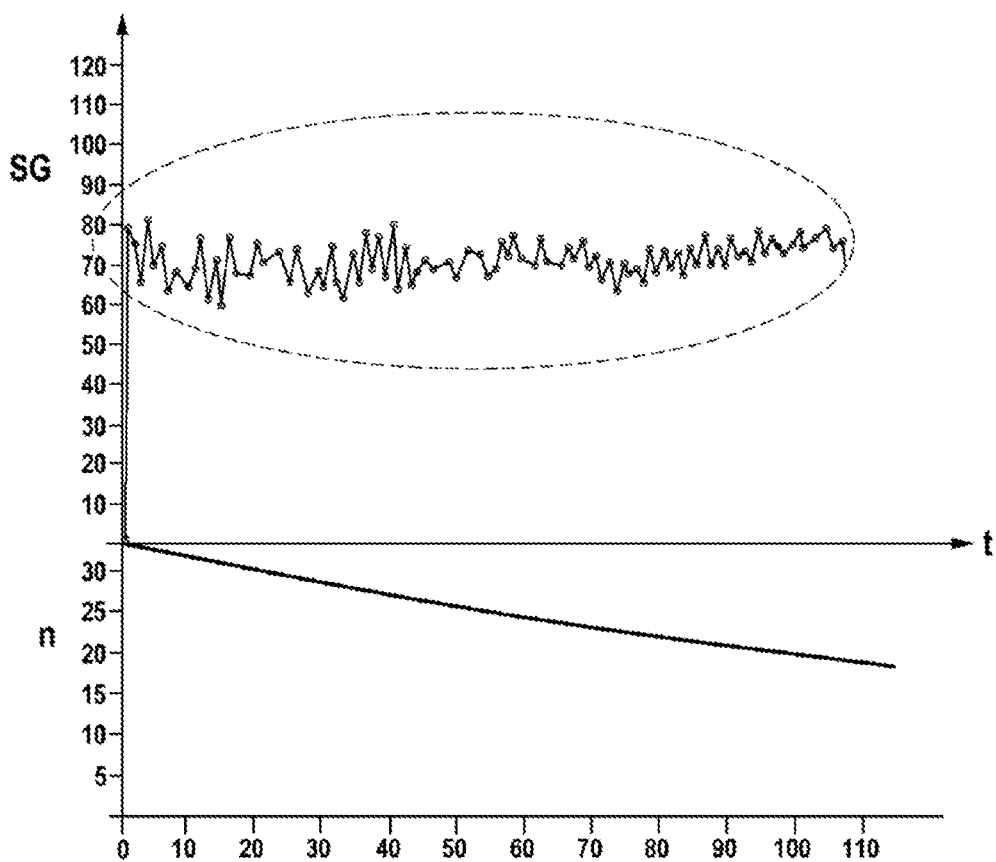
FIG. 2 shows a basic depiction of a temporal profile of the synthetic variable during a braking operation using the method according to the present disclosure.

One profile according to the present disclosure of the aforementioned synthetic variable SG during the braking operation of the universal motor is schematically depicted in FIG. 2. It is apparent that in comparison to FIG. 1, the synthetic variable SG is now essentially held constant in the framed region or does not exceed a defined, permissible upper limit, wherein the duration of the braking operation is essentially unchanged in comparison to FIG. 1. However, gentle operation of the universal motor 100 advantageously results due to the profile of the synthetic variable SG of FIG. 2, because the commutation device 10 is operated using operating parameters which essentially produce no brush sparking or sharply reduced brush sparking.

Advantageously, the method according to the present disclosure is also usable during the start-up of the universal motor 100.

Figure 3:
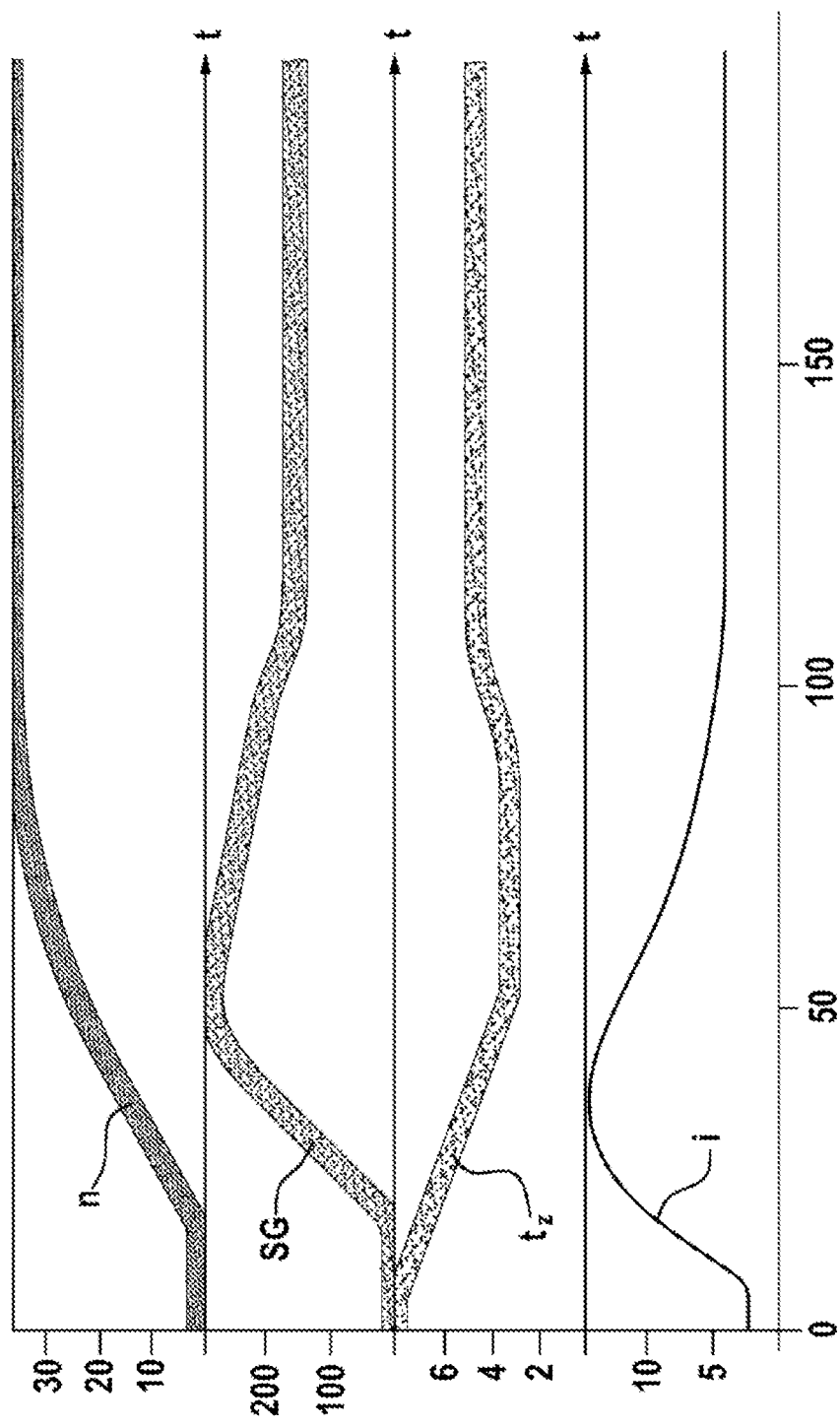
FIG. 3 shows a basic depiction of a conventional temporal profile of the synthetic variable during a start-up of a universal motor.

FIG. 3 shows a conventional start-up (soft start) of the universal motor 100. It is possible to see temporal profiles of the rotational speed n and the synthetic variable SG, which in this case is formed as a mathematical product of the rotational speed n and the electric current i of the universal motor 100. Furthermore, temporal profiles of the the firing time $t_z$ and the current i of the universal motor 100 are apparent in the figure. It is apparent that the electric current i assumes high values within the first 500 ms, which heavily stress the commutation device 10 of the universal motor 100 and may cause electrical erosion.

Figure 4:
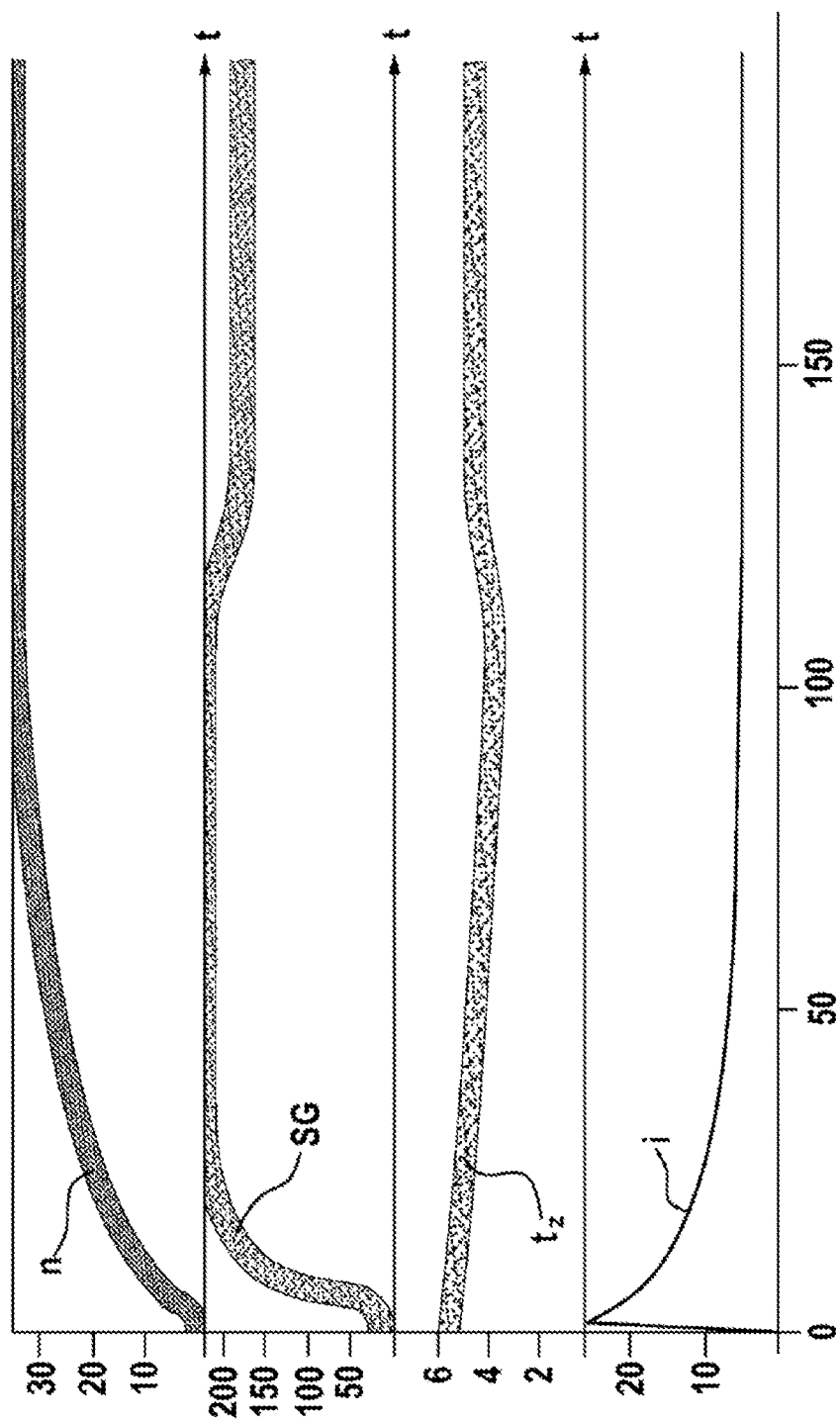
FIG. 4 shows a basic depiction of a temporal profile of the synthetic variable during a start-up using the method according to the present disclosure.

FIG. 4 shows an optimized start-up of the universal motor 100 using the method according to the present disclosure. In comparison to FIG. 3, it is apparent that the rotational speed n reaches its intended final value more rapidly, wherein the synthetic variable SG is increased to a maximum value at an early stage and is then essentially held constant during the entire phase of the start-up or does not exceed a defined, permissible upper limit. The current i is very briefly brought to a maximum value only at the start and is subsequently reduced during the entire phase of the start-up, whereby gentle operation of the commutation device 10 is supported.

Gentle operation of the commutation device 10 is therefore supported by means of the method according to the present disclosure, in particular during start-up and during braking operation of the universal motor 100.

Instead of the aforementioned physical operating parameters electric current i, rotational speed n, other physically measurable variables may also be used for forming the synthetic variable SG, for example, armature voltage, armature field voltage, torque, etc. In this case, it is possible to use different technical characteristic values of the measured variables, for example, effective value, peak value, etc.

In one variant, it may be provided that, after an ascertainment of the synthetic variable SG carried out in advance, it is stored in a control device 20 as a static parameter set for a software program, and is used in this way for regulation or control of the universal motor 100.

Alternatively, it may also be provided that during the operation of the universal motor 100, the physical operating parameters used for operation are detected essentially in real time, wherein the formation of the synthetic variable SG also occurs practically in real-time operation, and the universal motor 100 is controlled by influencing the firing angle or the firing instant of an electronic switching device (for example, triac, IGBT, etc.). In this way, changes in the operating characteristics may advantageously also be taken into account over the service life of the universal motor 100.

Alternatively, it may also be provided to carry out a kind of self-learning process for the synthetic variable SG, whereby the behavior of the universal motor 100 over time continuously adjusts to a specific usage behavior of the user and is thereby operated in a manner which is adjusted in an increasingly improved way over time.

Figure 5:
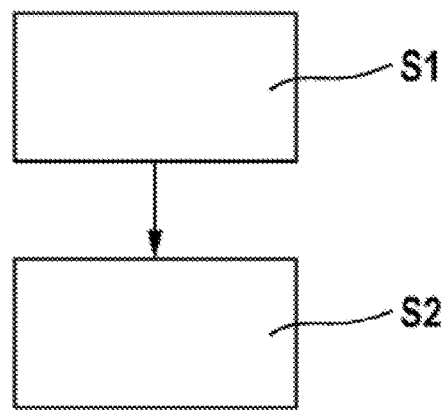
FIG. 5 shows a basic depiction of a sequence of one specific embodiment of the method according to the present disclosure.

FIG. 5 schematically depicts a basic sequence of one specific embodiment of the method according to the present disclosure.

In a first step S1, a synthetic variable SG is ascertained from at least two physical operating parameters of the universal motor 100.

In a second step S2, the universal motor 100 is operated using such operating parameters that the synthetic variable SG essentially remains at a constant level or at least does not exceed a defined, permissible upper limit.

Figure 6:
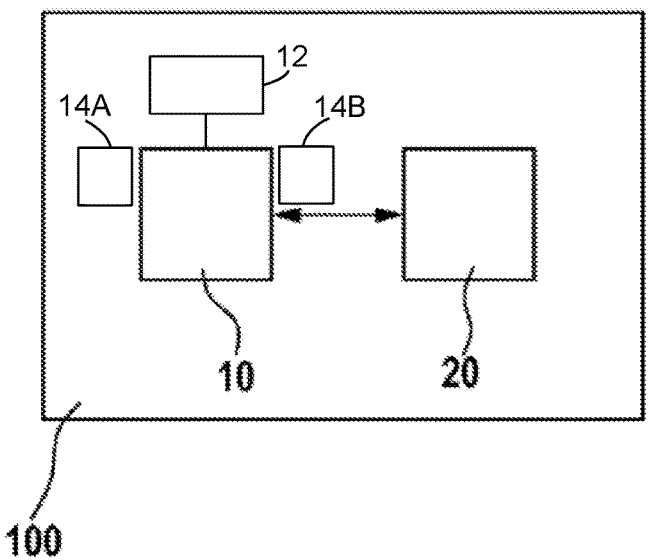
FIG. 6 shows a basic depiction of one specific embodiment of the universal motor according to the present disclosure.

FIG. 6 shows a basic block diagram of one specific embodiment of the electric universal motor 100 according to the present disclosure including a commutation device 10. It is apparent that the universal motor 100 includes an electronic control device 20, in which the method according to the present disclosure may be stored as a fixed parameter set, or by means of which the method according to the present disclosure essentially carries out an ascertainment of the synthetic variable SG in real time, and influences (for example, regulates or sets) a firing angle or firing instant of a switching semiconductor element (not depicted) of the commutation device 10 via the commutation device 10.

In summary, the present invention provides an improved method for operating an electric universal motor, via which essential operating characteristics of the universal motor may be improved due to optimized operation of the commutation device, based on dynamically influencing the firing angle. As a result, a significant reduction of brush sparking of the brushes 14A and 14B or an improved commutator concentricity may advantageously be achieved at the armature 12, which may advantageously result in lower wear, thus resulting in an extended operating life of the universal motor.

In addition, a rapid attainment of the full rotation speed or power is supported by means of the method according to the present disclosure, which makes the method according to the present disclosure particularly suitable in particular for use in electric tools (for example, angular grinders, drills, and the like) whose electric motors are subjected to large changes in rotational speed with sharply fluctuating loads within short switching cycles.

Although the present disclosure has been described based on a universal motor, it goes without saying that the present disclosure may be used for any types of common electric motors having an armature/rotor which include a commutation device.

Those skilled in the art will thus modify the described features of the present disclosure in a suitable manner and/or combine them without deviating from the core of the present disclosure.

The invention claimed is:

1. A method for operating a universal motor, the method comprising:
    measuring a first physical operating variable corresponding to a rotational speed of an armature in the universal motor;
    measuring a second physical operating variable corresponding to one of an amperage, armature voltage, and armature field voltage, in the universal motor;
    ascertaining with a control device a synthetic variable corresponding to a mathematical combination of the first physical operating variable and the second physical operating variable; and
    operating the universal motor with the control device to influence a firing angle to adjust the second physical operating variable to maintain the synthetic variable at or below a predetermined level while the rotational speed of the armature in the universal motor changes during at least one of a braking and a start-up operation to reduce or eliminate sparking from a plurality of brushes in the universal motor.

2. The method as claimed in claim 1, the operating the universal motor further comprising:
    operating the universal motor with the control device to influence the firing angle of the motor to adjust the second physical operating variable to maintain the synthetic variable at a substantially constant level while the rotational speed of the universal motor changes.

3. The method as claimed in claim 1, the operating the universal motor further comprising:
    ascertaining with the control device the synthetic variable as a product of (i) the rotational speed of the armature, and (ii) an amperage in the universal motor.

4. A universal motor comprising:
    a commutator;
    a plurality of brushes;
    an armature; and
    a control device configured to control a firing angle of an electrical signal supplied to the plurality of brushes and the commutator to turn the armature, the control device being configured to:
        measure a first physical operating variable corresponding to a rotational speed of an armature in the universal motor;
        measure a second physical operating variable corresponding to one of an amperage, armature voltage, and armature field voltage, in the universal motor;
        ascertain a synthetic variable corresponding to a mathematical combination of the first physical operating variable and the second physical operating variable; and
        operate the universal motor to influence a firing angle to adjust the second physical operating variable to maintain the synthetic variable at or below a predetermined level while the rotational speed of the armature in the universal motor changes during at least one of a braking and a start-up operation to reduce or eliminate brush sparking in the universal motor.

5. The universal motor as claimed in claim 4, the control device being further configured to:
    operate the universal motor to influence the firing angle of the motor to adjust the second physical operating variable to maintain the synthetic variable at a substantially constant level while the rotational speed of the universal motor changes.

6. The universal motor as claimed in claim 4, the control device being further configured to:
   ascertain the synthetic variable as a product of (i) the rotational speed of the armature, and (ii) an amperage in the universal motor.

\* \* \* \* \*